United States Patent [19]

Neuenschwander et al.

[11] Patent Number: 5,799,387
[45] Date of Patent: Sep. 1, 1998

[54] LAMINA STACK HAVING A PLURALITY OF OUTER PERIMETER CONFIGURATIONS AND AN APPARATUS AND METHOD FOR MANUFACTURING SAID STACK

[75] Inventors: Thomas R. Neuenschwander; Rick O. Habegger; Delno C. Abnet, all of Fort Wayne, Ind.

[73] Assignee: L.H. Carbide Corpordation, Fort Wayne, Ind.

[21] Appl. No.: 658,595

[22] Filed: Jun. 5, 1996

[51] Int. Cl.⁶ ............................................ H02K 15/02
[52] U.S. Cl. ............................ 29/598; 29/609; 29/738; 310/216
[58] Field of Search .................... 29/598, 596, 738, 29/732, 609; 310/216, 217, 218, 259; 336/216, 217, 232

[56] References Cited

U.S. PATENT DOCUMENTS

| | | | |
|---|---|---|---|
| 2,576,328 | 11/1951 | Allison | 164/104 |
| 2,671,951 | 3/1954 | Sliwiak | 29/155.61 |
| 2,975,312 | 3/1961 | Ploran | 310/217 |
| 3,202,851 | 8/1965 | Zimmerle | 310/259 |
| 3,203,077 | 8/1965 | Zimmerle | 29/155.5 |
| 3,512,435 | 5/1970 | Bossmann | 83/71 |
| 3,524,370 | 8/1970 | Thompson | 83/685 |
| 3,590,208 | 6/1971 | Martini et al. | 219/92 |
| 3,606,674 | 9/1971 | Givan | 29/609 X |
| 3,738,569 | 6/1973 | Killaly, Sr. | 234/43 |
| 3,802,068 | 4/1974 | Scott | 29/598 |
| 3,823,460 | 7/1974 | Bergmann | 29/203 |
| 3,834,013 | 9/1974 | Gerstle | 29/609 X |
| 4,110,895 | 9/1978 | Mitsui | 29/732 |
| 4,149,309 | 4/1979 | Mitsui | 29/596 |
| 4,160,182 | 7/1979 | Mitsui | 310/214 |
| 4,162,734 | 7/1979 | Dangelmaier | 29/433 |
| 4,264,663 | 4/1981 | Beenken | 428/132 |
| 4,272,579 | 6/1981 | Mitsui | 29/521 |
| 4,364,169 | 12/1982 | Kawano et al. | 29/596 |
| 4,383,356 | 5/1983 | Fichtner | 29/598 |
| 4,445,272 | 5/1984 | Bruhn et al. | 29/598 |
| 4,464,826 | 8/1984 | Bair | 29/738 X |
| 4,538,345 | 9/1985 | Diederichs | 29/596 |

(List continued on next page.)

FOREIGN PATENT DOCUMENTS

| | | |
|---|---|---|
| 0 084 568 | 8/1983 | European Pat. Off. . |
| 0 655 825 A1 | 5/1995 | European Pat. Off. . |
| 2017379.9 | 10/1971 | Germany . |
| 26 31 188 | 1/1978 | Germany . |
| 27 51 123 | 5/1979 | Germany . |
| 56-107764 | 8/1981 | Japan . |
| 56-129556 | 10/1981 | Japan . |
| 58-66557 | 4/1983 | Japan . |
| 06022508 | 7/1994 | Japan . |
| 2206453 | 1/1989 | United Kingdom ............ H01F 27/24 |

OTHER PUBLICATIONS

International Search Report, Dated Oct. 1997.
Computer Numerical Control of Production of Rotor and Stator Lamination Segments for Large Electrical Generators and Motors, Arthur Silverton, Metalworking '82, Mar., 1982.

*Primary Examiner*—James F. Coan
*Attorney, Agent, or Firm*—Baker & Daniels

[57] ABSTRACT

A method and apparatus for manufacturing a lamina stack having laminas with a plurality of outer perimeter configurations. Each of the outer perimeter configurations has at least one common choke surface. The common choke surfaces form, when the laminas are stacked, a choke contacting surface on the outer perimeter surface of the lamina stack which extends continuously in the axial direction from the top lamina to the bottom lamina. The invention provides a method for manufacturing interlocked lamina stacks using a selectively actuated punches in a die assembly to stamp laminas with a plurality of outer perimeter configurations and to stack the laminas in a choke barrel with an alignment surface which cooperates with the common choke surface and securely holds the stamped laminas in position while the stack is being formed. Rotation of the choke barrel compensates for strip thickness variations.

32 Claims, 9 Drawing Sheets

U.S. PATENT DOCUMENTS

| | | | |
|---|---|---|---|
| 4,619,028 | 10/1986 | Neuenschwander | 29/33 L |
| 4,728,842 | 3/1988 | Martin | 29/596 |
| 4,736,516 | 4/1988 | Pfaffenzeller et al. | 29/738 X |
| 4,738,020 | 4/1988 | Neuenschwander | 29/598 |
| 4,827,237 | 5/1989 | Blackburn | 336/210 |
| 4,888,866 | 12/1989 | Hansen | 29/598 |
| 5,075,150 | 12/1991 | Webb et al. | 430/162 |
| 5,087,849 | 2/1992 | Neuenschwander | 29/598 |
| 5,123,155 | 6/1992 | Neuenschwander | 29/596 |
| 5,349,740 | 9/1994 | Neuenschwander | 29/596 |
| 5,359,763 | 11/1994 | Neuenschwander | 29/738 |
| 5,373,622 | 12/1994 | Neuenschwander | 29/596 |
| 5,377,115 | 12/1994 | Neuenschwander | 364/468 |
| 5,406,243 | 4/1995 | Jenkins et al. | 336/217 |

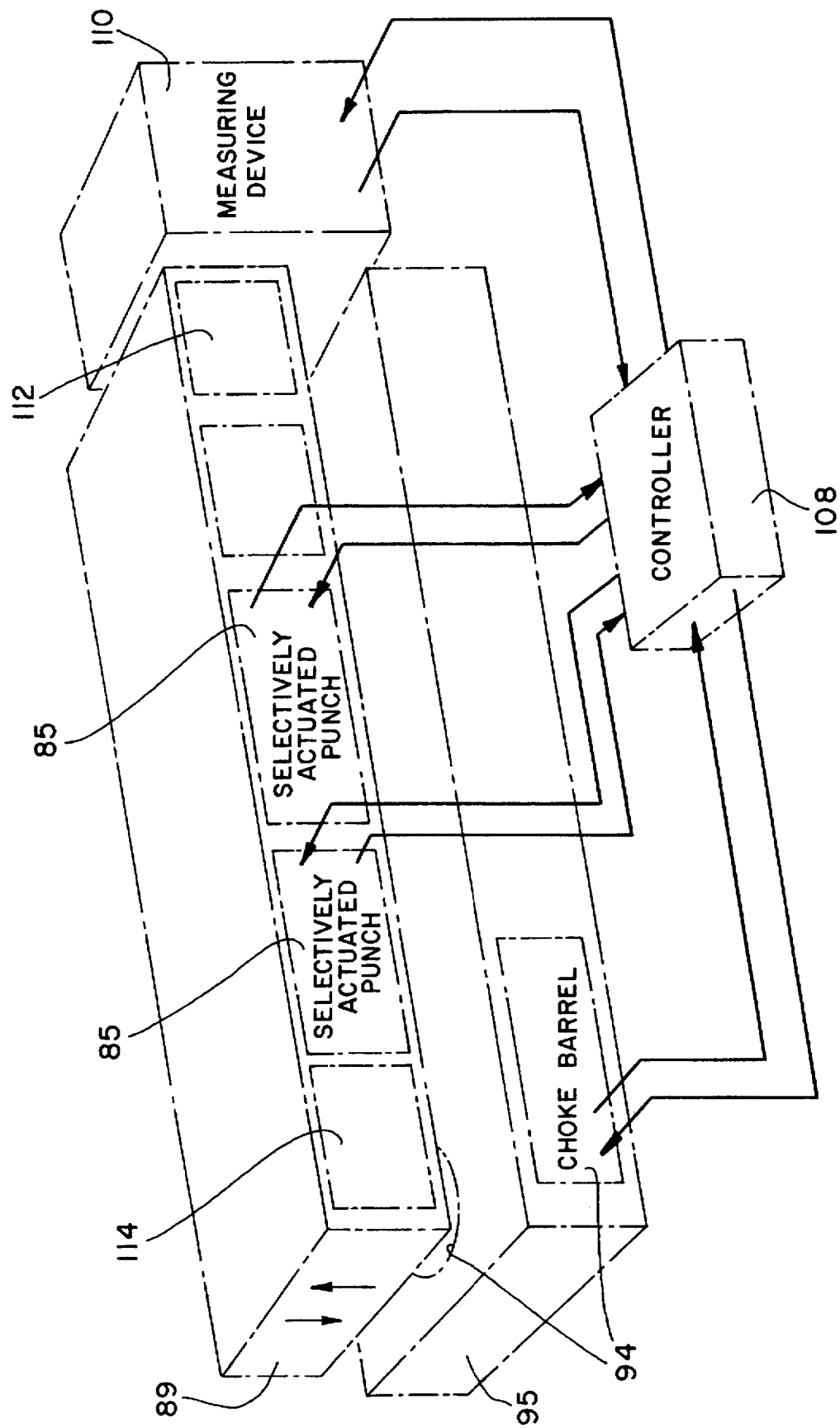

5,799,387

LAMINA STACK HAVING A PLURALITY OF OUTER PERIMETER CONFIGURATIONS AND AN APPARATUS AND METHOD FOR MANUFACTURING SAID STACK

BACKGROUND OF THE INVENTION

1. Field of the Invention

The present invention relates generally to laminated parts for use in electric motors and generators. More particularly, the present invention relates to electric motor or generator stators and rotors having stacked laminas and the methods and machines, i.e., progressive dies, used in the manufacture of such laminated parts.

2. Description of the Related Art

The manufacture of stators and rotors employing stacked laminas is well known in the art. Typically, the laminas are blanked from a continuous strip stock and then stacked and bound together to form the stator or rotor. Progressive die assemblies for producing stator or rotor laminations wherein a strip of lamination material is fed through a sequence of punching steps to progressively form the laminas to the desired end configuration are also well known.

It is also known to form, in the laminas, interlock tabs which extend below the generally planar lamina surface and engage slots formed in the next lower lamina. In this manner, a plurality of laminas may be stamped from a single sheet of strip stock and formed into an interconnected lamina stack in the die by means of interlocking tabs and slots. More specifically, to form an interconnected lamina stack each lamina, except the bottom lamina of the stack, may have a plurality of arcuately spaced interlock tabs (typically ranging from 3 to 8 circumferentially disposed tabs) depressed from the lamina lower surface adjacent to slots formed in the next lower lamina. Each interlock tab engages a corresponding slot in the next lower lamina of the stack, generally by the entire thickness of the tab. The bottom lamina of the stack may have the interlock tabs blanked and removed to avoid interlocking the bottom lamina with the next lower lamina which forms the top lamina of the previous stack. In rare instances the tab may lock as deeply as two lamina thicknesses, in which case two end laminations must be blanked.

Rotor laminas generally include a plurality of skewed conductor slots which are formed around the periphery of the rotor stack in arcuately spaced relation to one another by rotationally indexing the laminas with respect to the rotor stack. Indexing involves rotating the rotor stack and the last produced lamina relative to each other by a predetermined rotational increment so that, when the laminas are combined in a stack, the rotor conductor bar slot defined by adjacent conductor slots are skewed or slanted relative to the stack axis. Stator stacks, on the other hand, include winding slots around the inner periphery of the stack which extend parallel to the stack axis, without skew, and are shaped to receive the stator windings. In some circumstances, however, it may be desired to build an "inside-out" motor wherein the outer lamination stack forms the rotor and could, thus, require skewed slots.

Another system of forming a stack involves loosely stacking the laminas as they are formed and blanked from the stock material in a progressive die assembly. After all the laminas for a given stack are collected, they are shuttled to a pressing station and the laminas are pressed together to engage the interlock tabs and thereby form the lamina stack. Loosely stacking the laminas after they are blanked from strip stock has several disadvantages; loose stacking and subsequent pressing does not as consistently lock adjacent laminas together; the required handling slows production times; and the system lacks a means for automatically correcting thickness inconsistencies of the stock material or creating a desired skew angle for the conductor slots. A similar process can be employed without the use of interlocking features on the laminas. Assembly of the non-interlocked laminas requires the welding, keying or riveting (or pinning) of the laminas.

In response to these problems, an autorotation system for compensating for the nonuniform stock thickness was developed which both rotates and interlocks the stacked laminas. This system compensates for variations in lamina thickness while still properly skewing the conductor slots of rotor laminas, as described in U.S. Pat. Nos. 4,619,028; 4,738,020; 5,087,849 and 5,123,155, all assigned to the assignee of the present invention and the disclosures of which are incorporated herein by reference. In the system disclosed in the aforementioned patents, the choke barrel holding the lamination stack is automatically rotated before each lamina is blanked from the strip stock and thereafter interlocks the lamina's circumferentially disposed tabs with the slots of the uppermost lamina of the incomplete lamination stack within the barrel.

In the apparatus and method disclosed in the aforementioned patents, the individual laminas are typically rotated through an angle of 180°. Although the laminas may be rotated through other angles, the angle must be at least 360°/(number of interlock tabs) so that the interlocking tabs and slots are properly aligned.

The above described improvements have been implemented with rotor cores and stator cores which have identical outer perimeters which enables their insertion into a choke barrel designed to hold a lamination having the outer perimeter configuration of the laminations being stacked. Many of these improvements require the use of interlock tabs in combination with autorotation of a partially formed lamina stack. Autorotation requires the use of a rotating choke barrel which firmly holds the partially formed lamina stack in position as blanked laminas are punched into engagement with the uppermost lamina of the stack. The choke barrel is typically configured to match the outer perimeter of the blanked lamina and may be slightly undersized, e.g., by 0.001 inch, so that the laminas will be firmly held and accurately positioned within the choke barrel. The laminas located in the choke barrel thereby provide a back pressure or resistance which facilitates the entry of the interlock tabs of the next lamina when it is pressed into the choke barrel.

In certain applications, however, it is desirable to have a lamination stack, typically a stator core but also rotor cores in some situations, wherein a portion of the laminations have an outside perimeter which differs in shape and/or size from the remainder of the stack of laminations, i.e., having a plurality of distinguishable configurations. For example, the stator core may incorporate a fastening feature, such as a projecting flange, to provide a mounting surface which is integral with the stator core, or the stator may incorporate a sealing feature to provide a seal between the housing of the motor and the stator core for motors to be used in environments which include flammable vapors. To incorporate such features, a fraction of the laminations in a stack are manufactured with integral portions which provide such features.

Traditionally, the manner in which stator cores having a plurality of outer perimeter configurations have been produced is to stamp the differently configured laminas in separate dies, i.e., each die provides only a single lamina configuration. The plurality of dies produce loose laminations having the desired plurality of outer perimeter configurations. The laminations must then be manually assembled at a station where laminations of the different outer perimeter configurations are placed in the proper vertical stack arrangement and are pressed together to interlock the laminas. Instead of using interlocking tabs, the laminas may also be secured together in some other conventional fashion such as by the use of clamps, pins, rivets or welds.

There are several drawbacks to this manner of manufacturing a lamination core having laminations with a plurality outer perimeter configurations. For one, the manufacturing process is relatively expensive due to the use of multiple dies and the large amount of labor and handling which is required. Additionally, the process does not allow for the automatic correction of lamina thickness inconsistencies.

Another problem with this method of manufacture is that it often produces stator cores having winding slots with slight discontinuities and sharp edges. Because separate dies are used to form the differently configured laminas, the stator winding slots are punched by different dies. Although similar in shape, the different punches cannot be precisely identical and will generally have minor inconsistencies which, when the differing laminas are stacked, cause the slots in adjacent laminations to misalign, thereby creating slight discontinuities and sharp edges in the winding slots at the points where the two differently configured laminas meet. These small discontinuities can scratch and damage the winding coil wires which are inserted into the winding slots.

The discontinuities of the prongs which define the winding slots and interior surface of the stator core also reduce the efficiency of the electric motor or generator which is produced with the stator core. The efficiency of the motor or generator may be reduced if the gap between the stator core and rotor core is enlarged to account for the discontinuities because the efficiency of the motor or generator is decreased as the gap increases.

Thus, what is needed is an apparatus and method for producing lamina stacks having laminas with a plurality of differently configured outer perimeters which overcomes the difficulties present in the prior art.

SUMMARY OF THE INVENTION

The present invention provides an apparatus and method for manufacturing a lamina stack comprised of laminas having more than one outer perimeter configuration which may be punched in a single die, assembled into a stack in the die to minimize the manual handling of the laminas and which will allow for the automatic interlocking and autorotation of the laminas.

An advantage of the present invention is that it permits the automatic stacking of laminations having a plurality of distinguishable outer perimeter configurations and the automatic computation of accumulated measured stock thicknesses of those laminations. The need to manually handle and stack laminas to form a lamina stack having a plurality of outer perimeter configurations is thereby eliminated. The conveyor, pressing and stack securing equipment used in the traditional manual assembly method are also eliminated by the present invention.

Another advantage is that the automatic stacking of the laminations within the die assembly increases the speed of production and facilitates the use of interlocking tabs.

Yet another advantage is that the sharp edges and discontinuities which may be present in the winding slots of lamina stacks having a plurality of outer perimeter configurations are reduced due to the use of a single die.

Still another advantage is that the inner diameter of the stator core can be maintained within tighter tolerances thereby permitting a reduction in the gap between the rotor and stator and thereby resulting in a reduction of magnetic losses.

The invention comprises, in one form thereof, a selectively actuated die assembly for producing a lamina stack formed from laminas which have more than one predetermined outer perimeter configuration. Each of the differing outer perimeter configurations has at least one common choke surface so that when the laminas are stacked, the resultant stack has at least one choke surface on its outer perimeter which extends continuously along the exterior edge of each lamina in the stack in a direction parallel to the axis of the lamina stack. The laminas are then stacked in a choke barrel with their common choke surfaces being aligned to create a lamina stack comprised of laminas having a plurality of outer perimeters and at least one choke surface extending continuously in an axial direction across a portion of the outer perimeter of each of the laminas. The choke barrel may also include an alignment surface, the common choke surfaces of the laminas being stacked in registry with the alignment surface.

The invention comprises, in another form thereof, a selectively actuated die assembly for stamping laminas having a plurality of outer perimeter configurations with at least one common choke surface. The apparatus also includes a rotatable choke barrel in which the laminas are stacked with the common choke surface(s) being aligned. Autorotation of the laminas having a plurality of outer perimeter configurations is thereby enabled.

The invention comprises, in another form thereof, a method of manufacturing a lamina stack in a die assembly having a selectively actuated punch and a choke barrel. Strip stock is guided through the die assembly and a plurality of laminas are stamped from the strip stock by the selectively actuated punch to form laminas having a plurality of outer perimeter configurations. The laminas each have a common choke surface which are aligned as the laminas are formed into a stack in the choke barrel. It is also possible to autorotate the laminas prior to stacking the laminas. The invention also comprises a lamina stack manufactured in accordance with these methods.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 11 is a schematic illustration of the interconnections between a die controller, a measuring device, and a die with a rotatable choke barrel.

Figure 1:
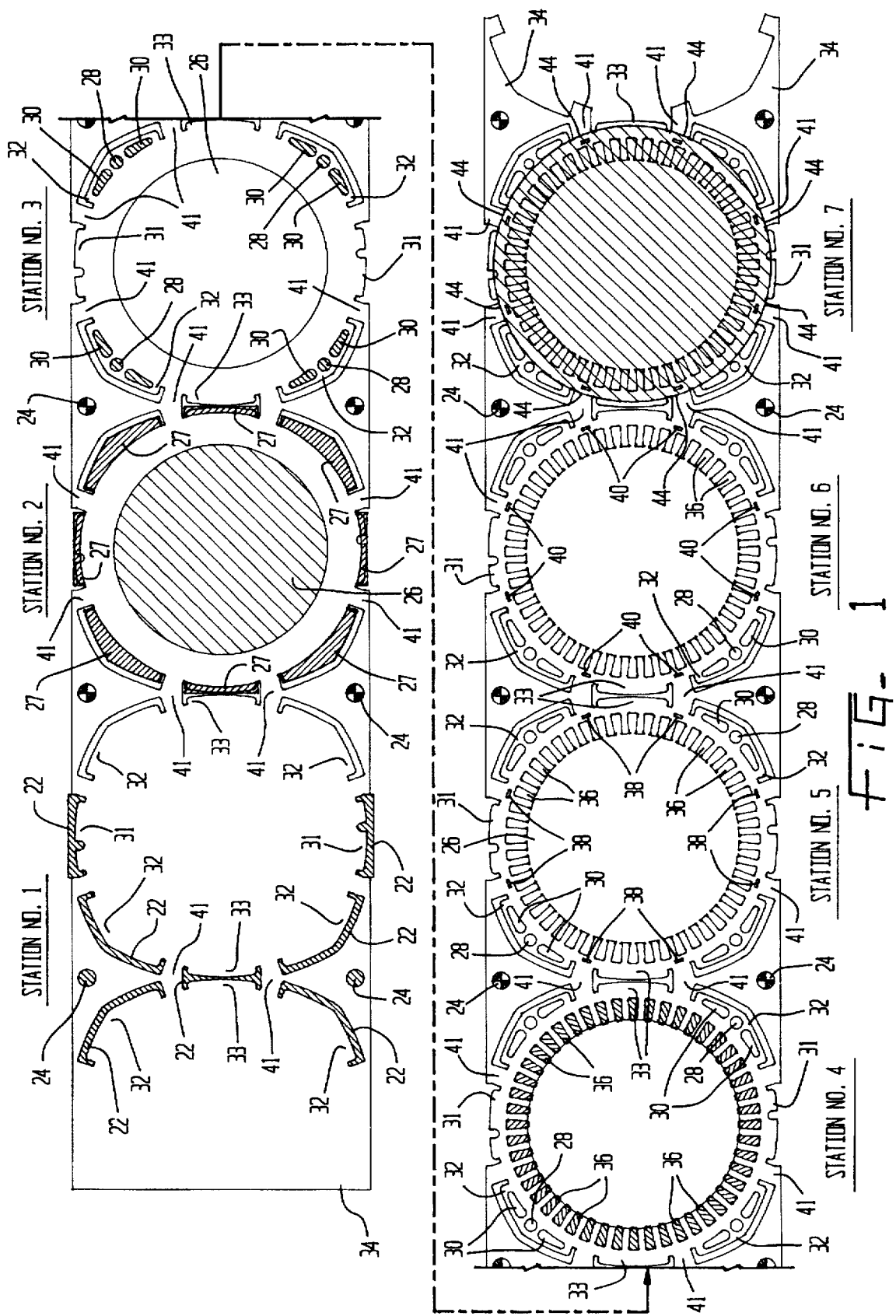
FIG. 1 is a plan view of a strip layout for producing a stator core having laminas with a plurality of distinguishable outer perimeter configurations.

Corresponding reference characters indicate corresponding parts throughout the several views. Although the drawings represent the preferred embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description.

Figure 2:
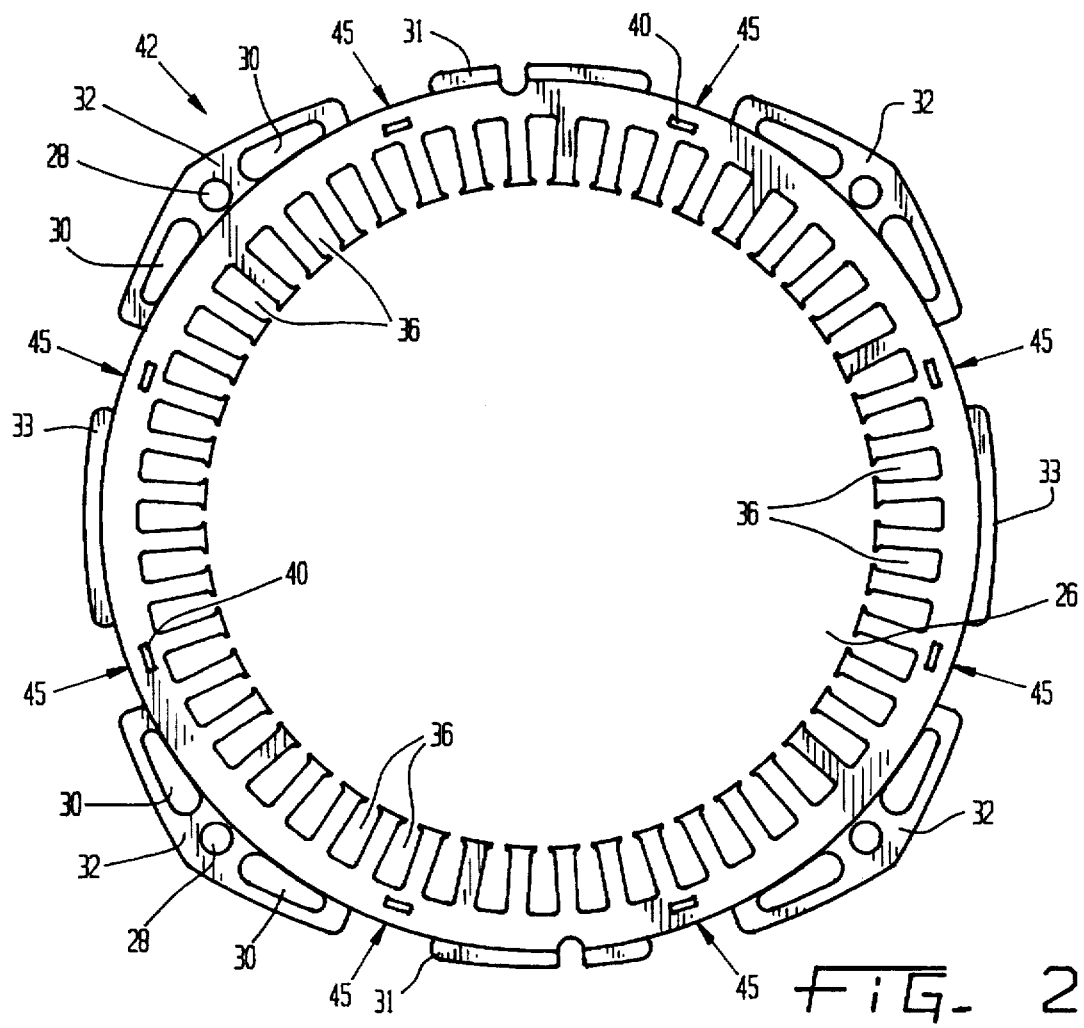
FIG. 2 is a plan view of the stator core created by stacking the laminas produced by the strip layout of FIG. 1.
Figure 3:
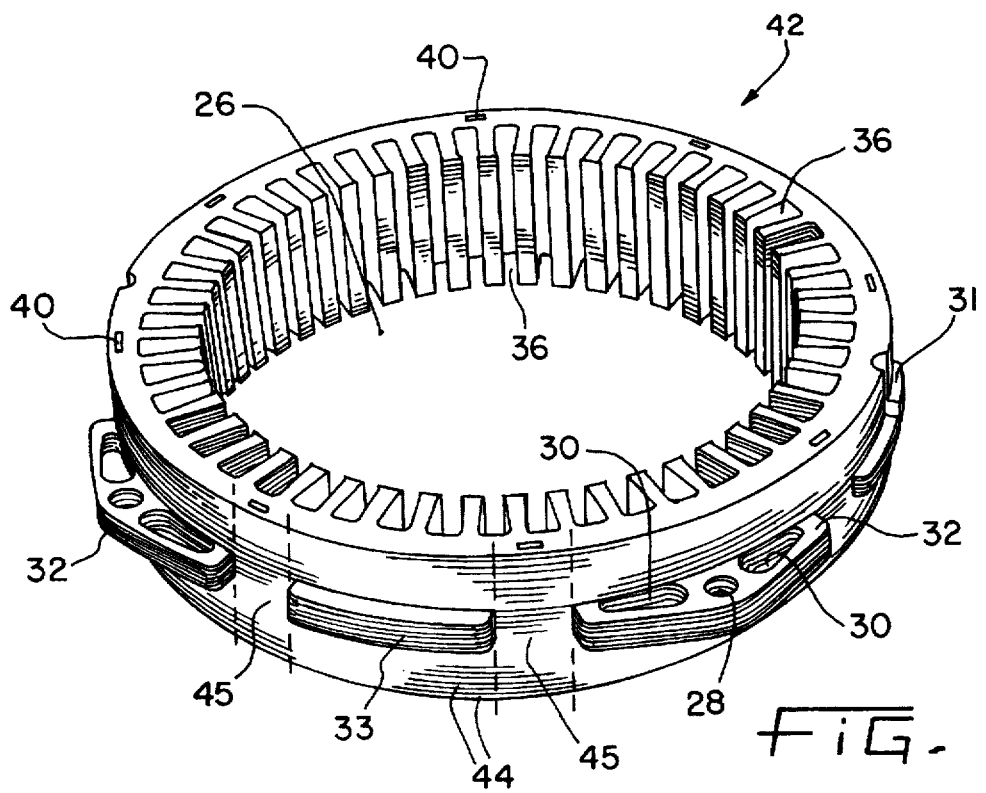
FIG. 3 is a perspective view of the stator core of FIG. 2.

A strip layout showing a stamping progression in accordance with the present invention is shown in FIG. 1. The laminations produced by the strip layout of FIG. 1 are used to produce a stator core having projecting flanges on only some of the laminations within each stator core as shown in FIGS. 2 and 3.

At Station No. 1, slots 22 which define the outer perimeter of projecting flanges for two adjacent laminations are punched. Pilot pin holes 24 used to guide and align the strip stock 34 through subsequent stations are also punched at Station No. 1. Flange defining slots 22 are punched for each lamination, even for those laminations which will have the flanges selectively removed at a later station.

Station No. 2 includes a selectively actuated punch which punches the stator bore hole 26 in each lamination. In most cases, this station would comprise either a rotor blank out punch or stator bore hole shave punch. The flanges 31, 32 and 33 defined by slots 22 are selectively removed from some of the laminations at Station No. 2 as shown by outline 27 of the selectively actuated flange removal punches.

At Station No. 3 flange bolt holes 28 and flange slots 30 are punched. The strip stock is shown with flanges 31, 32 and 33 at Station Nos. 3–7, however, for laminations which do not have flanges 31, 32 and 33 due to the actuation of the flange removal punches at Station No. 2, the material comprising the flanges would not be present. Thus, the punches at Station No. 3 do not have to be selectively actuated. By limiting the use of selectively actuated dies to only those situations where they are indispensable the cost of the die assembly is minimized.

The stator winding slots 36 for all of the laminations are punched at Station No. 4. The use of a single punch cluster at Station No. 4 to stamp the winding slots 36 for each of the laminations produces a winding slot in the finished stator core 42 which has fewer discontinuities and sharp edges than a stator core comprised of laminations produced by a plurality of dies.

Station No. 5 is a selectively actuated punch station which is actuated for the bottom lamination of each stator stack. The material 38 removed at Station No. 5 would otherwise be formed into an interlock tab 40 at Station No. 6. The punches at Station No. 6 do not have to be selectively actuated because if the punches are always operative they would simply not create any additional interlock features in the bottom laminations formed at. Station No. 5.

At Station 7, all of the laminations are blanked from the remaining strip stock 34 by severing the material bridges 41 and are pressed into a choke barrel. It is not necessary for the punch to engage the entire surface area of flanges 31, 32 and 33. For the present embodiment the choke barrel is nonrotatable, however, as will be described below, the choke barrel utilized in the present invention may also be rotatable. The material bridges 41 are cut at the same location on both the flanged and unflanged laminas, thereby creating common choke surfaces 44, as shown in FIGS. 1 and 3, on the edge of each lamina.

The choke barrel (shown schematically in FIG. 11) into which the laminas are pressed has alignment surfaces which correspond with and engage each of the common choke surfaces 44. The alignment surfaces define an outer perimeter which is equal to or slightly less, e.g., by 0.001 inch, than the outer perimeter defined by the common choke surfaces 44 to thereby provide an interference fit engagement with the laminas. This interference fit engagement of each of the laminas maintains the laminas in an aligned position and also resists the movement of the laminations through the choke barrel. This allows subsequent laminations to be pressed into interlocked engagement with the laminas already in the choke barrel.

When the stack has been completed, the individual common choke surfaces 44 of each lamination form a stack choke surface 45, shown in FIG. 3, which extends continuously in an axial direction of the stack across a portion of the outer perimeter of each of the laminas which comprise the stack.

A flanged stator core 42 produced by the laminations punched from the strip stock 34 of FIG. 1 is shown in FIGS. 2 and 3. A controller is used to selectively actuate the punches at Stations 2 and 5. By actuating the punches of Station Nos. 2 and 5 in a controlled sequence, laminations may produced in the order they are required to form flanged stator core 42.

Figure 5:
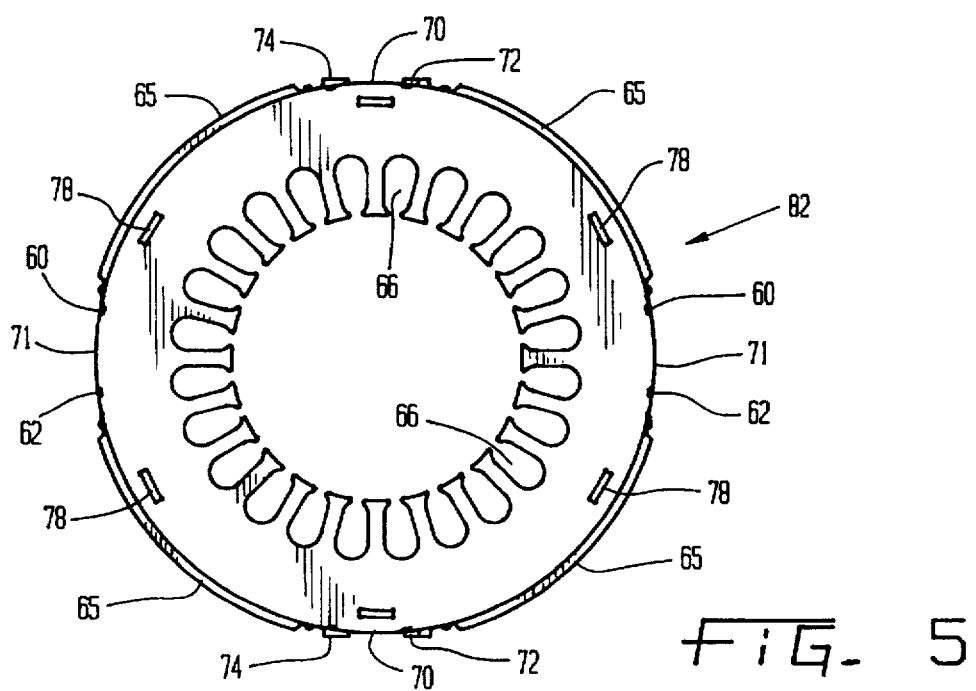
FIG. 5 is a plan view of the stator core produced by stacking the laminas produced by the strip layout of FIG. 4.
Figure 4A:
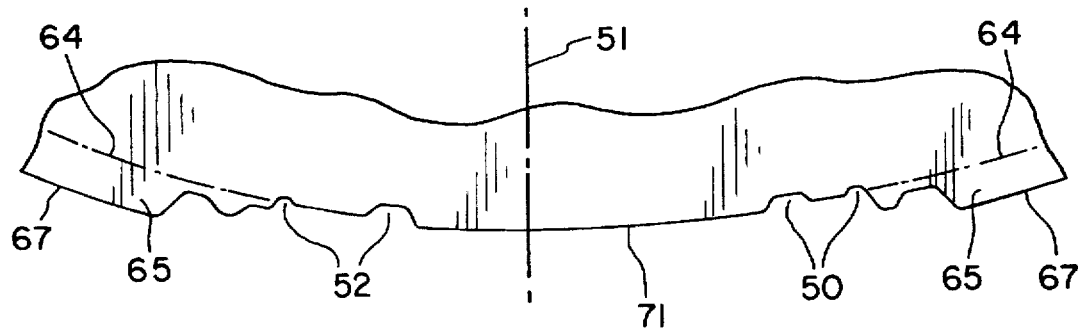
FIG. 4A is an enlarged partial plan view of detail 4A of FIG. 4.
Figure 4B:
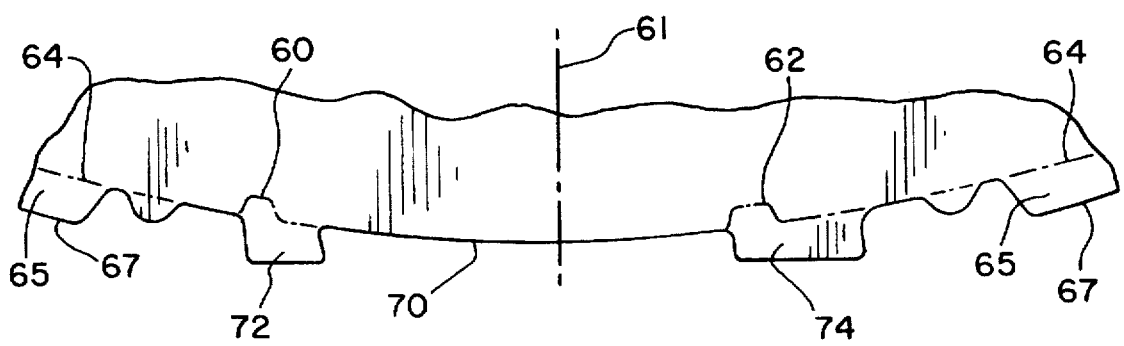
FIG. 4B is an enlarged partial plan view of detail 4B of FIG. 4.
Figure 4:
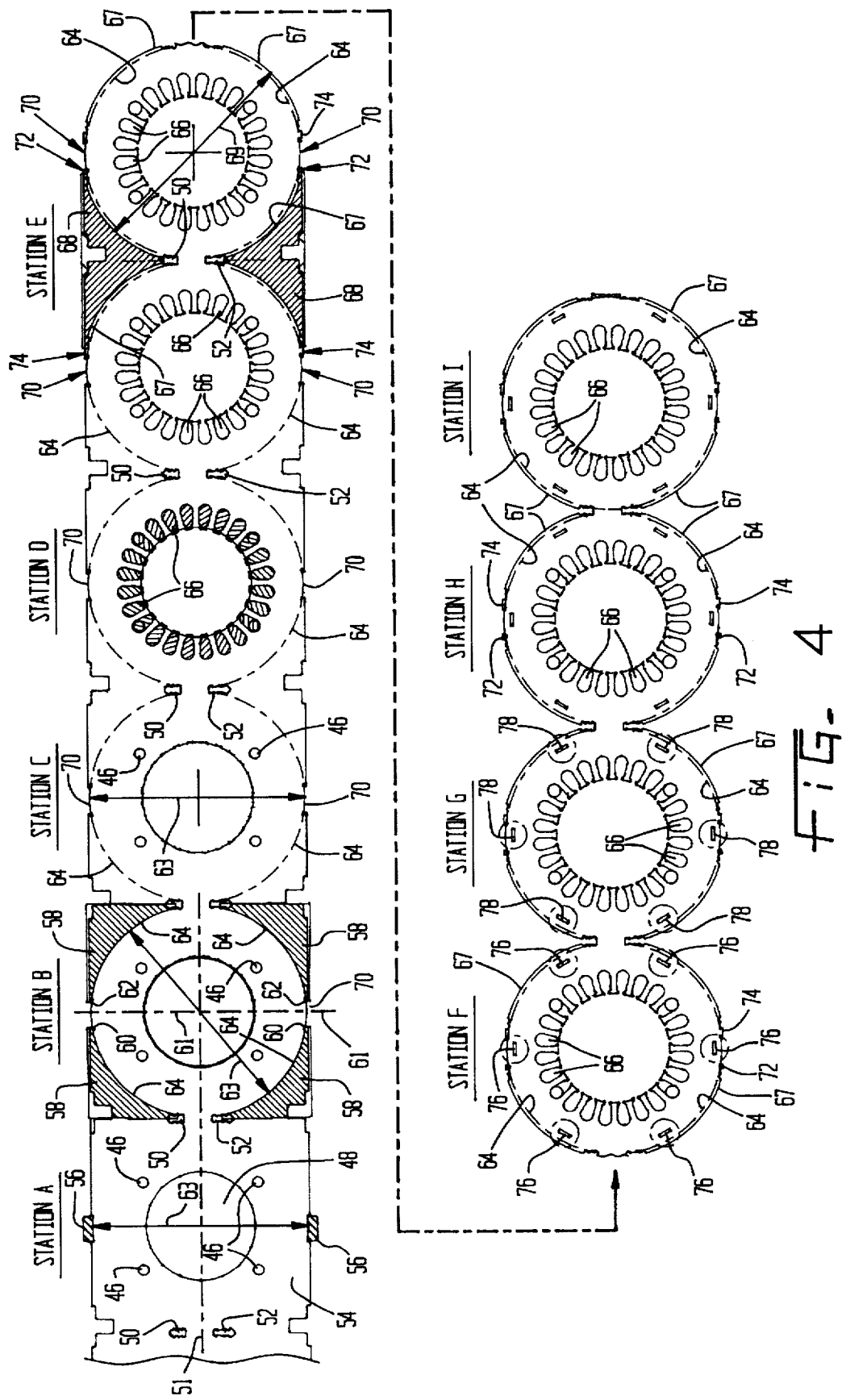
FIG. 4 is a plan view of a second strip layout for producing a stator core having a plurality of distinguishable outer perimeter configurations.
Figure 6:
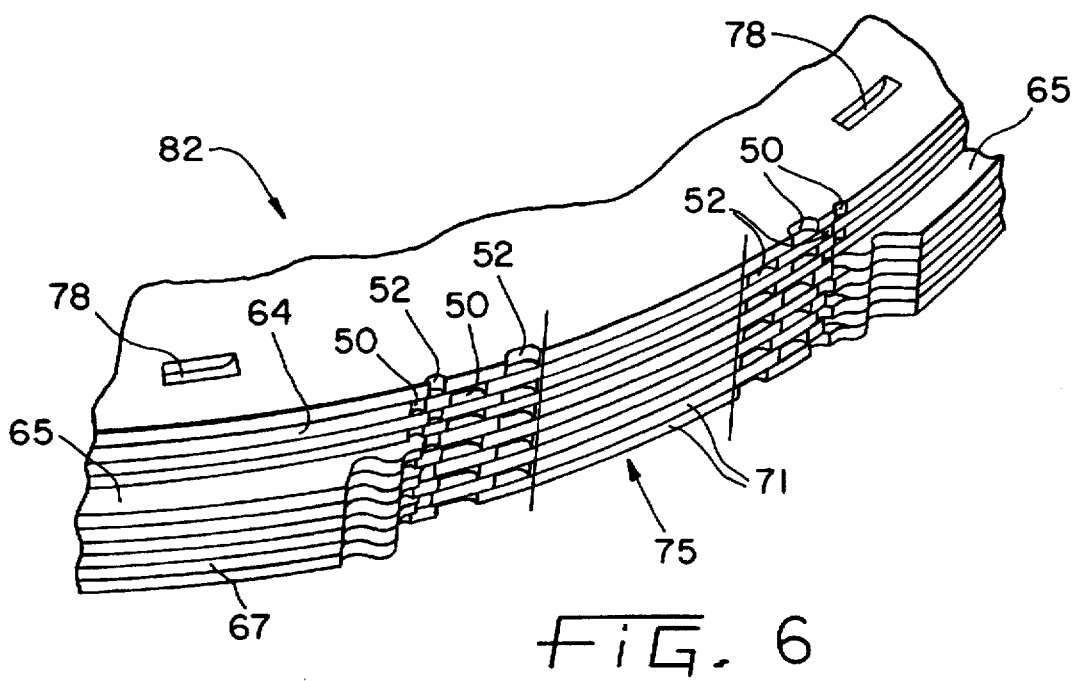
FIG. 6 is a partial perspective view of the stator core of FIG. 5.
Figure 7:
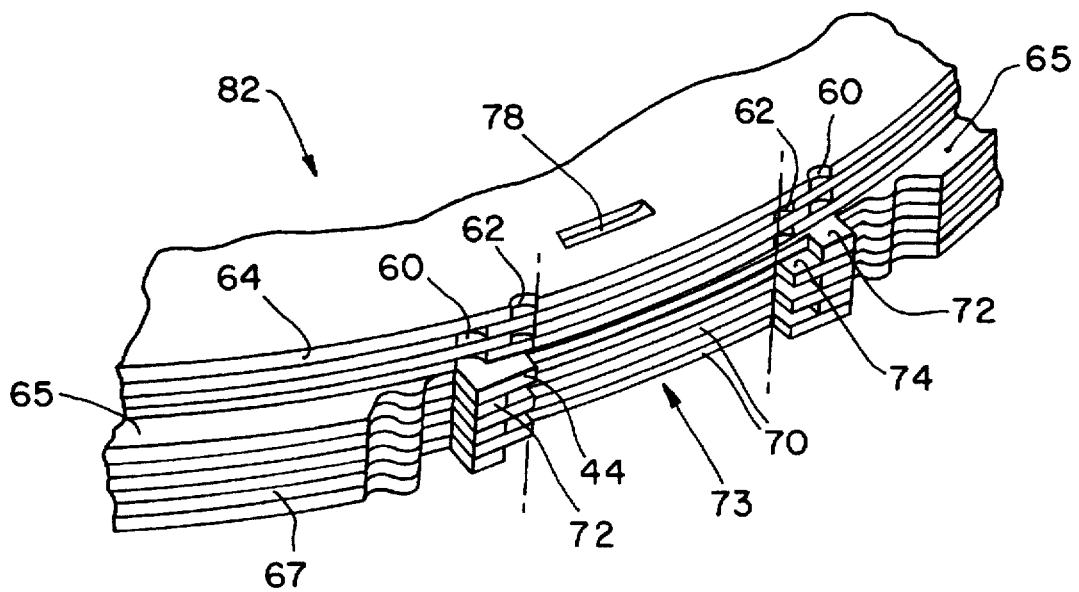
FIG. 7 is another partial perspective view of the stator core of FIG. 5.

A second strip layout showing a stamping progression in accordance with the present invention is shown in FIG. 4. The laminations produced by the strip layout of FIG. 4 are used to produce a stator core having projecting flanges on only some of the laminations within each stator core as shown in FIGS. 5–7. Prior to reaching Station A, pilot pin holes 46, stator bore hole 48, first ribbed slot 50 and second ribbed slot 52 are punched during the production of a rotor lamination which is removed from the strip stock 54 prior to Station A.

At Station A, two common choke surfaces comprising a circular portion with a minor diameter 63 are defined by stamping edge slots 56. Edge slots 56 are not perfectly symmetrical about centerline 61 but are slightly offset and extend further to the left as seen in FIG. 4.

Station B is a selectively actuated, or cammed, station at which a minor circular perimeter 64 having a minor outer diameter 63 is defined by triangular punches 58 for certain laminations. Just inside the edges of the common choke surfaces 70 defined at Station A, first and second rounded corners 60 and 62 project inwardly on the punches and thereby cut the common choke surfaces 70 at a roughly 90° angle and avoid the difficulties which can arise when attempting to feather a cut into a preexisting edge.

First and second ribbed slots 50 and 52 also have similar rounded corners to allow for a cleaner cut. Second ribbed slot 52 is closer to centerline 51 than first ribbed slot 50; and rounded corners 62 are closer to centerline 61 than rounded corners 60 as further explained herein below.

Station C is idle and the minor circular perimeter 64 is shown in dashed outline. The material outside the minor perimeter 64 would not be present for those laminations which were stamped by the selectively actuated die at Station B.

The winding slots 66 are stamped at Station D for all of the laminas. At Station E the major outside perimeter 67, having a major diameter 69, is punched by means of two punches 68 which form an hourglass shape. Station E does not have to be selectively actuated and removes no material for those laminations which have already had a minor perimeter defined at Station B. The hourglass shaped punches 68 do not intersect common choke surface 70 on the edge of each lamination but instead leave short and long locator ribs 72 and 74, respectively.

Figure 8:
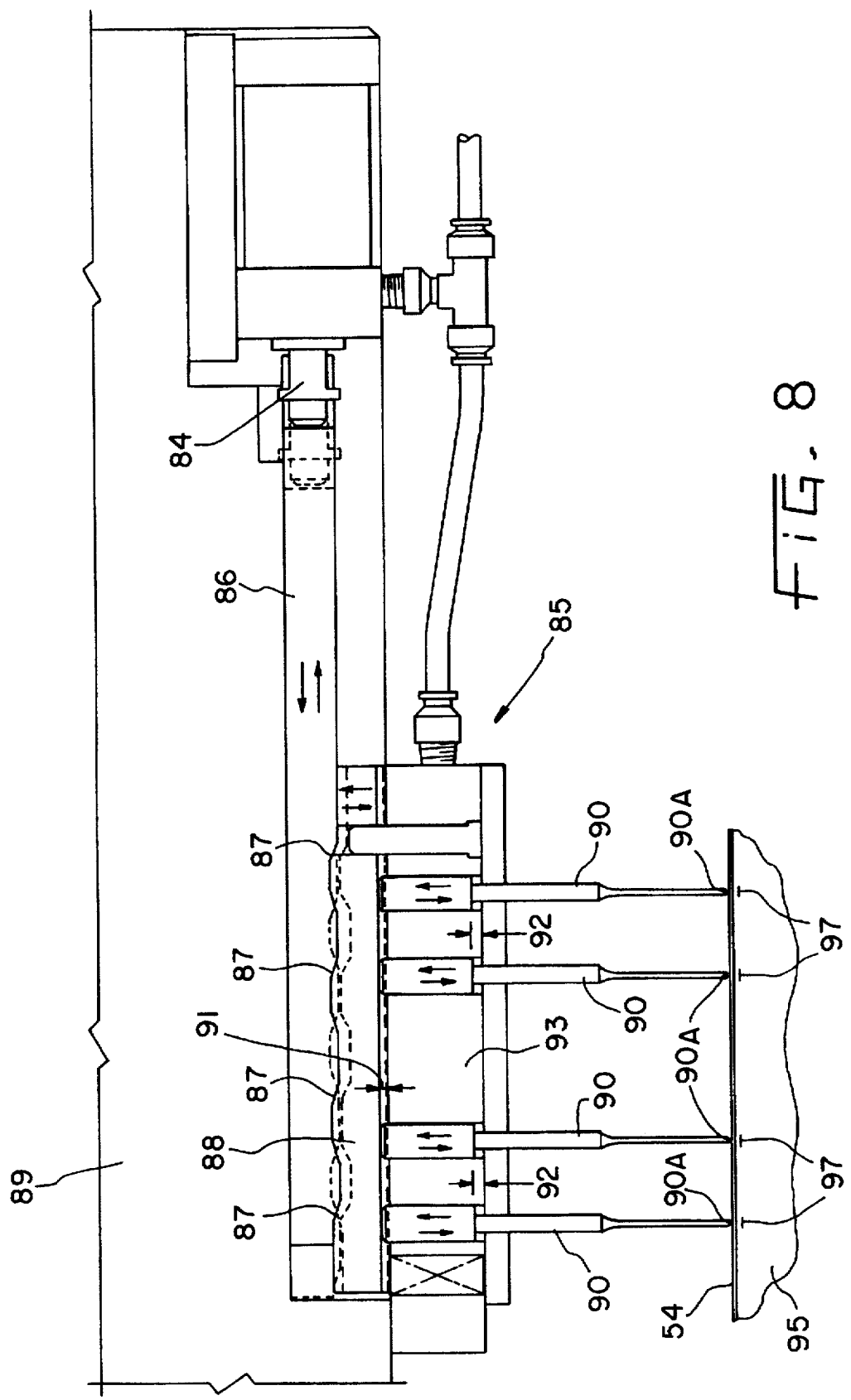
FIG. 8 is an elevational view of the camming arrangement of a selectively actuated die for manufacturing laminas with a plurality of outer perimeter configurations.

Station F is selectively actuated and punches a tab receiving slot 76 in those laminations which will form the bottom lamination of each lamination stack 82. A partial cross-sectional view of Station F is shown in FIG. 8 and illustrates the operation of a selectively actuated punch 85. Piston 84 is used to control the position of first camming bar 86 which reciprocates in the horizontal direction to thereby move camming bar 88 in a vertical direction due to the interaction of camming surfaces 87. When camming bars 86 and 88 are in the positions shown in solid lines, die punches 90 are positioned as shown in FIG. 8. When in this position, die punches 90 do not remove material from the strip stock. Die punches 90 are allowed to reciprocate vertically with respect to punch block 93 as well as move vertically as a unit with upper die assembly 89.

When piston 84 moves first camming bar 86 into the position shown in dotted outline in FIG. 8, the second camming bar 88 is moved into the position shown by the dotted outline in FIG. 8 due to the interaction of camming surfaces 87. In this actuated position the second camming bar 88 is moved downward a short vertical distance 91 and thereby forces punches 90 to reciprocate downward distance 92 with respect to punch block 93 and into an actuated position. The upper die assembly 89 is shown in its lowermost position with respect to die bed 95 in FIG. 8. As seen in FIG. 8, punch tips 90A do not punch strip stock 54 during operation of the die when the punches 90 are not in an actuated position. When actuated, punch tips 90A reach a lowermost position at lines 97 within a cooperating aperture (not shown) in the die bed 95 when the upper die assembly 89 is moved downward as a unit. Thus, the punches 90 create tab receiving slots 76 in the strip stock 54 during operation of the die with the punches actuated but do not create tab receiving slots 76 during operation of the die when the punches are not actuated. Other cammed or selectively actuated stations operate in a similar manner. A center interlock may be alternatively used such as described in U.S. patent application Ser. No. 07/966,876 filed Oct. 26, 1992, assigned to the assignee of the present invention, the disclosure of which is expressly incorporated herein by reference.

At Station G, shown in FIG. 4, interlock tabs 78 are punched. Station H is idle, and at Station I the laminations are punched into rotatable choke barrel 94 (not shown in FIG. 4). A small carrier strip 80 is cut from one end of the lamination defining a common choke surface 71 (shown in FIG. 6) and, on the opposing side of the lamination, another common choke surface 71 is defined along dashed line 81 where the lamination is cut from the strip stock. The carrier strip 80 interconnects the laminas allows the laminas to be transported as a strip between stations before they are blanked into the choke barrel. Other well known means may also be used; such pushback designs, which are generally impractical for stator cores because of the increased strip width which is required; and semi-scrapless designs, in which only a single cut, severing the lamina from the strip stock, is made at the last station.

Figure 9:
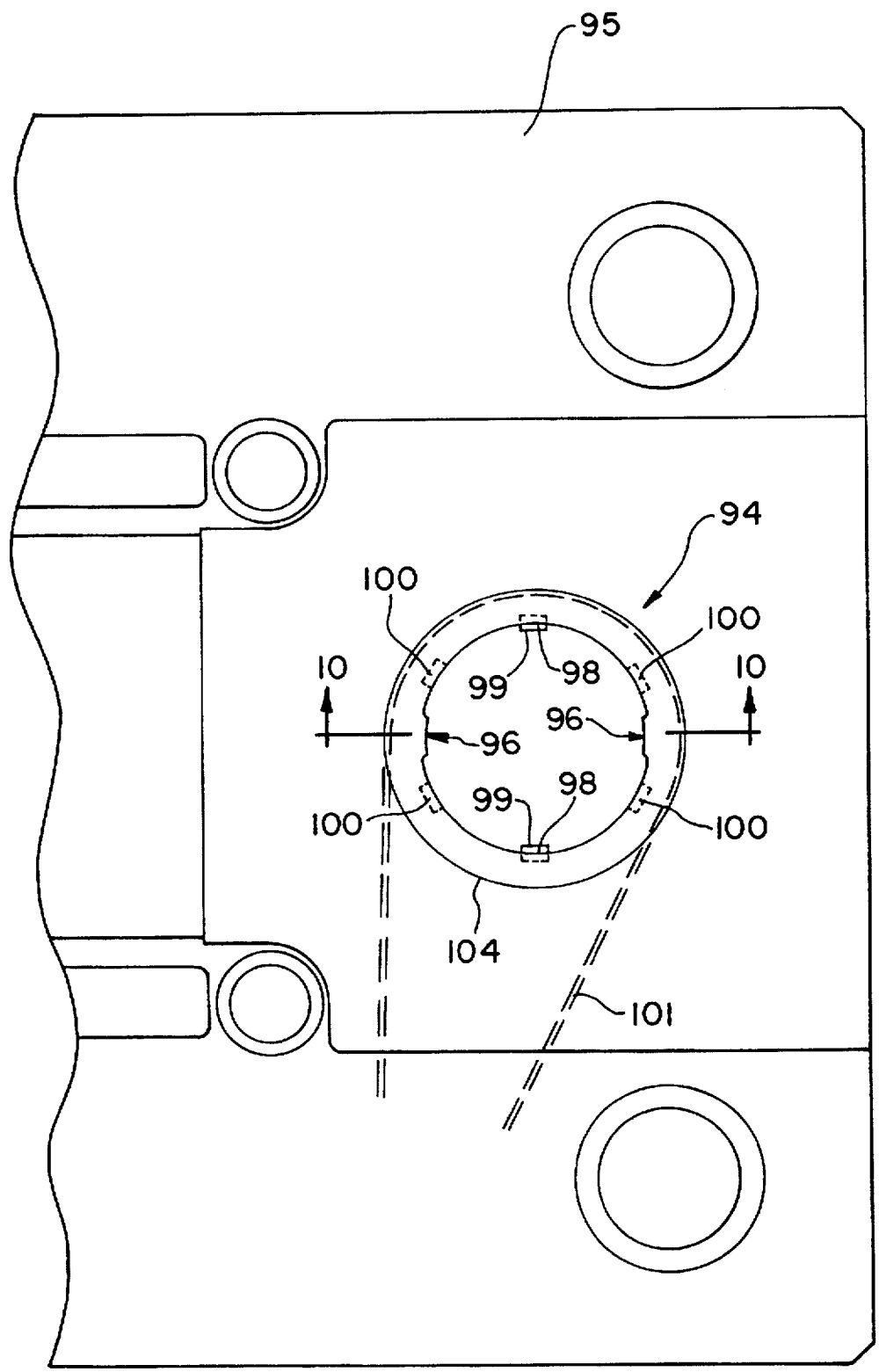
FIG. 9 is a partial plan view of a die with a rotatable choke barrel having an alignment surface.
Figure 10:
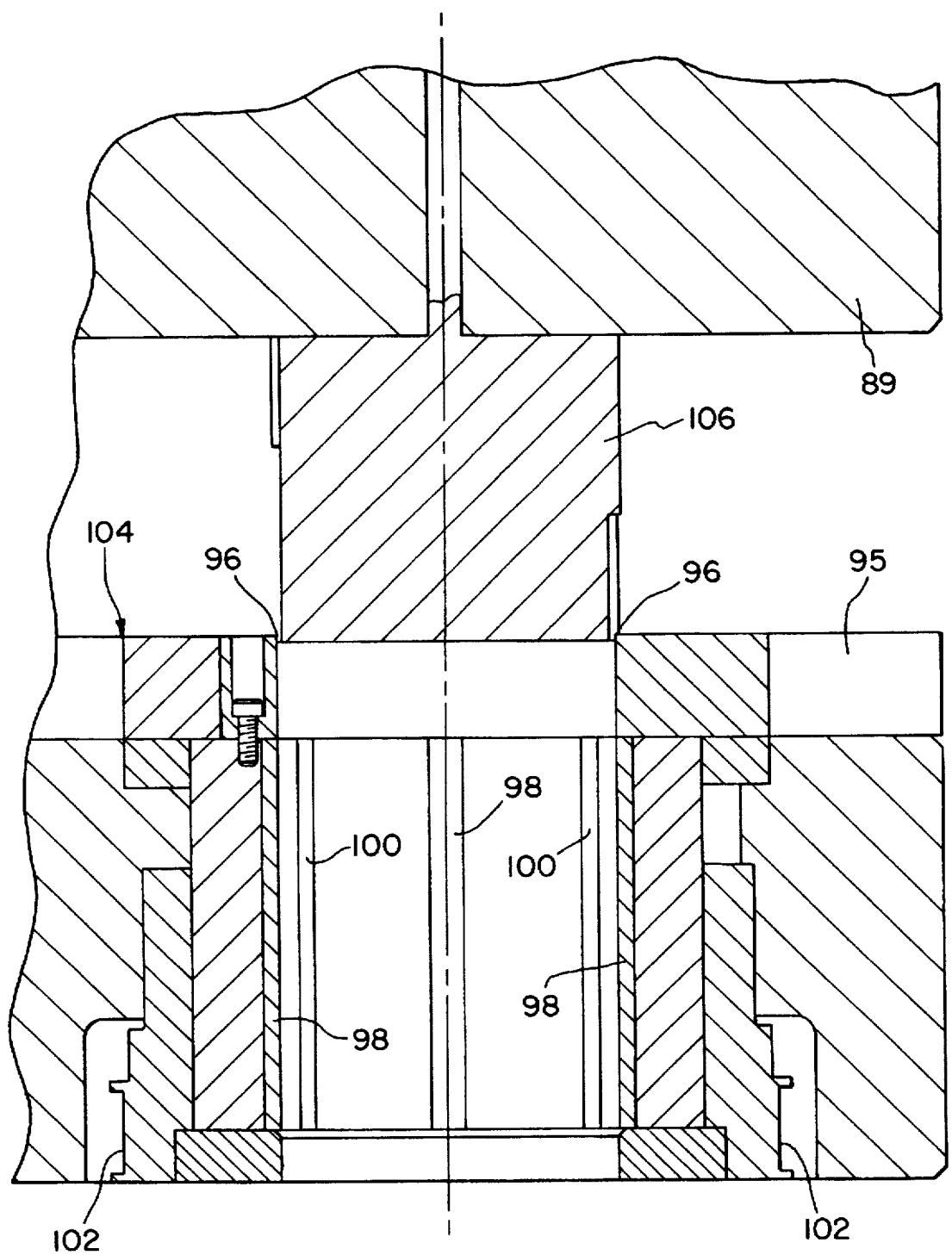
FIG. 10 is a cross-sectional view taken along line 10—10 of FIG. 9.

Rotatable choke barrel 94 is shown in FIGS. 9 and 10. Common choke surfaces 71, shown in FIG. 6, are defined by cutting edges 96. Carbide inserts 98 having aligning surfaces which engage common choke surfaces 70 of each of the laminations project into the interior of the choke barrel 94. Similar carbide inserts are located below cutting edges 96 and engage common choke surfaces 71 of each of the laminations. Carbide inserts 100 engage the outer perimeter surface of only those laminations having a major outside diameter.

A servo drive system, mechanical indexer or other means rotates the choke barrel 94 by means of a belt 101. The belt, not shown in FIG. 10, is located in recess 102. The rotating choke barrel 94 engages the die bed 95 at surface 104. Punch 106, shown in FIG. 10, presses the individual laminations into interlocked engagement with the laminations which are already within the choke barrel for those laminations which have interlock tabs. The rotation of choke rings is known in the art, as shown for example, by U.S. Pat. No. 5,377,115 assigned to the assignee of the present invention, the disclosure of which is expressly incorporated herein by reference.

The choke barrel 94 is rotated between each operation of the die assembly, for example, by 180° for producing lamination stack 82. Accurate rotation of the laminas is important to maintain vertical registry of the winding slots 66. The rotation serves several purposes, first it corrects for thickness inconsistencies in the strip stock. Second, it prevents ribbed slots 50 and 52 and indentations 60 and 62 from being aligned. The non-aligned slots and indentations are shown in FIGS. 6 and 7. This allows a cup-shaped endshield to be force-fit over the end laminas having a minor outside perimeter 64 and to abut the shoulder 65 formed by the laminas having a major outside perimeter 67. The endshield thereby hermetically seals the interior of the stator core. The hermetic seal would not be possible if the laminas were not rotated to prevent alignment of the ribbed slots 50 and 52 and rounded corners 60 and 62 on the laminas having a minor outside perimeter 64. Providing a hermetically sealed endshield allows a motor which incorporates stator core 82 to be safely used in environments where flammable vapors are present. Although, the disclosed embodiment rotates each lamina 180° with respect to the previous lamina, other angles and counts (or frequencies) of autorotation may also be used.

The individual common choke surfaces 70 and 71 disposed on the outer perimeter of each lamination form choke surfaces 73 and 75, respectively, which extend continuously in an axial direction of the stack across a portion of the outer perimeter of each of the laminas which comprise the stator stack 82 as illustrated in FIGS. 6 and 7. Common choke surfaces 70 and 71 are pressed into engaging contact with aligning surfaces 99 of carbide inserts 98 when the laminas are blanked into the rotatable choke barrel 94.

FIG. 11 provides a schematic illustration of the die assemblies used to manufacture lamina stacks 42 and 82. In FIG. 11, the initial station 112 corresponds to Stations 1 and A for the embodiments described above while the final station 114 corresponds to Stations 7 and I. FIG. 11 also includes schematic representations of selectively actuated punch stations 85 which correspond to Stations 2 and 5, and B and F, discussed above. FIG. 11 does not, however, include representations of each of the remaining stations. Choke barrel 94 can be either stationary or rotatable and does not require a communications link with controller 108 in all embodiments of the invention.

A controller 108 is used to control the selectively actuated punches 85 and may be used to control the autorotation of the choke barrel 94. The choke barrel 94 may also be stationary or employ a mechanical indexer, in which case the controller 108 would not need to be linked with choke barrel 94. The controller can be programmed to produce laminas in the alignment necessary to produce the desired stator cores. It is also possible, but not required, to employ a measuring device 110, shown schematically in FIG. 11, to determine the thickness of the sheet stock at one or more points along its width. The measured thickness values would be transmitted to the controller 108. The controller 108 would then be used to calculate the number of laminations which are required to achieve the desired height of the lamination stack, preferably by calculating the number of laminations required for each stack segment having a particular outside perimeter configuration.

Instead of measuring the strip stock at two different locations along its width and using a measured strip stock thickness inconsistency to calculate the amount of rotation required, the irregularities present in the strip stock can be evenly distributed about the lamina stack axis by rotating all of the laminas a predetermined amount without explicitly calculating the thickness inconsistency.

Autorotation of laminas to correct for thickness variations is known in the art and one such method is disclosed in U.S. Pat. No. 5,359,763 assigned to the assignee of the present invention, the disclosure of which is expressly incorporated herein by reference. Control of the stack height can also involve the use of a coreweighing system as disclosed in U.S. Pat. No. 5,365,021 assigned to the assignee of the present invention, the disclosure of which is expressly incorporated herein by reference.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of manufacturing a stack of laminas in a die assembly having a selectively actuated punch and a choke barrel; said method comprising:

a first step of guiding sheet stock material through the die assembly;

a second step of stamping a plurality of generally planar laminas from said sheet stock material with said selectively actuated punch, each of said laminas having an axis and an outer perimeter surface which are disposed substantially perpendicular to the plane of the lamina; each of said lamina outer perimeter surfaces defining one of a plurality of distinguishable predetermined outer perimeter configurations, a portion of each of said outer perimeter surfaces comprising a common choke surface for contacting the choke barrel;

a third step of coaxially stacking said laminas in the choke barrel by aligning said common choke surfaces to thereby form a stack of laminas having a plurality of outer perimeter configurations.

2. The method of claim 1 wherein the choke barrel has an alignment surface and said third step further comprises stacking said laminas within the choke barrel with said common choke surfaces in registry with the alignment surface.

3. The method of claim 1 further comprising:

providing said laminas with interlocking means prior to said third step; and a fourth step of interlocking said laminas in said choke barrel.

4. The method of claim 1 further comprising:

a fourth step of relatively rotating an incomplete stack disposed in said choke barrel and one of said plurality of generally planar laminas about a stack axis before stacking said one lamina.

5. The method of claim 1 further comprising:

a fourth step of, prior to said second step, determining the thickness of said sheet stock material at first and second spaced points on said sheet stock material for obtaining first and second thickness values, at said first and second spaced points, of a lamina;

a fifth step of comparing said first and second thickness values and determining a thickness variation therebetween; and a sixth step of relatively rotating an incomplete stack disposed in the choke barrel and one of said plurality of generally planar laminas about the stack axis before stacking said one lamina to thereby compensate for lamina thickness variation.

6. The method of claim 1 wherein one of said plurality of predetermined outer perimeter configurations defines a stator mounting flange.

7. The method of claim 1 wherein said lamina outer edges each includes at least four common choke surfaces.

8. The method of claim 1 wherein said second step further comprises counting said laminas and producing said plurality of generally planar laminas in a predetermined sequence.

9. The method of claim 1 wherein the stack is comprised of a plurality of stack segments, each of the stack segments consisting of laminas of the same outer perimeter configuration and having a predetermined height; said method further comprising:

a fourth step of, prior to said second step, determining the thickness of said sheet stock material; and a fifth step of determining the number of laminas for each of said stack segments.

10. The method of claim 9 further comprising:

a sixth step of relatively rotating an incomplete stack disposed in said choke barrel and one of said plurality of generally planar laminas about said stack axis before stacking said one lamina.

11. The method of claim 1 further comprising a fourth step, prior to said third step, of stamping features in at least one of said laminas with a second selectively actuated punch.

12. A rotor or stator made according to the method of stamping electric motor laminas from sheet stock material provided from a supply, the laminas each having a planar surface, in a die assembly having a selectively actuated punch and a choke barrel to form a stack of laminas in the choke barrel, the method comprising:

a first step of guiding said sheet stock material through said die assembly;

a second step of stamping a plurality of generally planar laminas from said sheet stock material with the selectively actuated punch, each of said laminas having an axis and an outer perimeter surface which are disposed substantially perpendicular to the plane of the lamina; each of said lamina outer perimeter surfaces defining one of a plurality of distinguishable predetermined outer perimeter configurations, a portion of each of said outer perimeter surfaces comprising a common choke surface for contacting said choke barrel;

a third step of coaxially stacking said laminas in the choke barrel with said common choke surfaces being aligned to thereby form a stack of laminas having a plurality of outer perimeter configurations.

13. The rotor or stator of claim 12 wherein the choke barrel has at least one alignment surface and said third step further comprises coaxially stacking said laminas with said common choke surfaces in registry with the alignment surface.

14. The rotor or stator of claim 12 wherein the method of stamping further comprises:

providing said laminas with interlocking means prior to said third step; and a fourth step of interlocking said laminas in said choke barrel.

15. The rotor or stator of claim 12 wherein the method of stamping further comprises:

a fourth step of relatively rotating an incomplete stack disposed in the choke barrel and one of said plurality of generally planar laminas about said stack axis before stacking said one lamina.

16. The rotor or stator of claim 12 wherein the die assembly consists of a single die assembly.

17. A die assembly for manufacturing a stack of laminas from sheet stock material, said die assembly comprising:

a punching station;

a stacking station;

first means for guiding the sheet stock material to said punching station;

a selectively actuable punch at said punching station for stamping generally planar laminas having one of a plurality of predetermined outer perimeter configurations, the laminas each having at least one common choke surface defining a portion of said outer perimeter configurations;

a choke barrel at said stacking station for receiving and stacking the laminas with the common choke surfaces being aligned to thereby form a stack comprised of laminas having a plurality of outer perimeter configurations.

18. The die assembly of claim 17 wherein said choke barrel has at least one alignment surface whereby each of the laminas is stacked with the common choke surface being in registry with said alignment surface.

19. The die assembly of claim 17 further comprising means for providing the laminas with interlocking means for interlocking adjacently stacked laminas and further including ing means at said stacking station for interlocking the laminas to form an interlocked stack.

20. The die assembly of claim 17 further comprising:

means operatively associated with said selectively actuable punch for actuating said punch to stamp the laminas in a predetermined sequence whereby the laminas are consecutively stacked to form stacks having a plurality of stack segments, the segments each consisting of a predetermined number of one of the lamina configurations.

21. The die assembly of claim 17 further comprising:

rotational correction means for relatively rotating an incomplete stack and one of the laminas.

22. The die assembly of claim 21 wherein said rotational correction means comprises means for rotating said choke barrel.

23. The die assembly of claim 21 wherein the stack comprises a plurality of stack segments; each of the stack segments consisting of laminas having the same outer perimeter configuration; each of the stack segments having a predetermined height and predetermined position within the stack; and said rotational correction means rotates at least one of the laminas from each of said segments.

24. A control for a die assembly for manufacturing a stack of laminas having predetermined dimensions within said die assembly, the laminas having a plurality of predetermined outer perimeter configurations, said die assembly having a selectively actuable punch and a choke barrel with an alignment surface, said control comprising:

measuring means for determining a thickness value of the strip stock material and operatively associated with said control, said control having means for controlling the operation of said selectively actuable punch and for determining a stamping sequence for producing the stack having predetermined dimensions.

25. An apparatus for manufacturing electric motor parts from sheet stock material, said apparatus comprising:

a selectively actuable punch for stamping generally planar laminas having a plurality of predetermined outer perimeter configurations, the outer perimeter configurations each being defined in part by at least one common choke surface;

controller means coupled to said selectively actuable punch to control the stamping sequence of said selectively actuable punch;

a choke barrel; and stacking means for stacking the laminas in said choke barrel with the common choke surfaces being aligned.

26. The apparatus of claim 25 wherein said choke barrel further comprises an alignment surface and the laminas are stacked in said choke barrel with the common choke surfaces being in registry with said alignment surface.

27. The apparatus of claim 26 further comprising means to provide the laminas with interlocking means for interlocking adjacently stacked laminas and further including means for interlocking the laminas within said choke barrel.

28. The apparatus of claim 27 further comprising means to rotate said choke barrel.

29. A method of manufacturing a laminated stack in a die assembly having means for guiding sheet stock material through the die assembly, stamping means and a choke barrel; said method comprising:

a first step of stamping a plurality of generally planar laminas from said sheet stock material with the stamping means, each of said laminas having an outer perimeter surface defining one of a plurality of outer perimeter configurations, a portion of each of said outer perimeter surfaces comprising a common choke surface; and a second step of stacking said laminas in the choke barrel by aligning said common choke surfaces to thereby form a laminated stack.

30. The method of claim 29 wherein said second step further comprises stacking said laminas within the choke barrel with said common choke surfaces in registry with an alignment surface disposed in the choke barrel.

31. The method of claim 29 further comprising providing said laminas with interlocking means prior to said second step; and interlocking said laminas in said choke barrel.

32. The method of claim 31 further comprising:

relatively rotating an incomplete stack disposed in said choke barrel and one of said plurality of generally planar laminas about a stack axis before stacking said one lamina.

\* \* \* \* \*

UNITED STATES PATENT AND TRADEMARK OFFICE
CERTIFICATE OF CORRECTION

PATENT NO. : 5,799,387
DATED : September 1, 1998
INVENTOR(S) : Thomas R. Neuenschwander, et al.

It is certified that error appears in the above-identified patent and that said Letters Patent is hereby corrected as shown below:

ON THE TITLE PAGE

Add to item [56] U.S. PATENT DOCUMENTS the following references:

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 3 | 7 | 8 | 3 | 3 | 1 | 8 | 1/1/1974 | WIDSTRAND | 310 | 216 | |
| | | 4 | 5 | 9 | 7 | 1 | 6 | 8 | 7/1986 | Oboshi, et al. | | | |
| | | 4 | 9 | 0 | 0 | 6 | 3 | 6 | 2/1990 | Takenouchi, et al. | | | |
| | | 4 | 9 | 7 | 9 | 2 | 8 | 5 | 12/1990 | Martin | | | |
| | | 5 | 3 | 3 | 8 | 9 | 9 | 6 | 8/1994 | Yamamoto | | | |

Signed and Sealed this

Eighth Day of August, 2000

Attest:

Q. TODD DICKINSON

Attesting Officer

Director of Patents and Trademarks